United States Patent
Kocher (10) Patent No.: US 6,188,766 B1
(45) Date of Patent: Feb. 13, 2001

(54) APPARATUS AND METHOD FOR CONFIRMING, TIMESTAMPING, AND ARCHIVING PRINTER AND TELECOPIER TRANSMISSIONS

(75) Inventor: Paul C. Kocher, Menlo Park, CA (US)

(73) Assignee: Cryptography Research, Inc., San Francisco, CA (US)

(*) Notice: Under 35 U.S.C. 154(b), the term of this patent shall be extended for 0 days.

(21) Appl. No.: 08/810,913

(22) Filed: Mar. 5, 1997

(51) Int. Cl.[7] ..................................................... H04L 9/00
(52) U.S. Cl. ........................ 380/246; 380/243; 380/51; 380/55; 358/405; 358/448; 358/450
(58) Field of Search .................................... 358/405, 403, 358/1, 2, 448, 450; 380/30, 51, 55, 243, 246; 713/178

(56) References Cited

U.S. PATENT DOCUMENTS

| | | | |
|---|---|---|---|
| 5,377,017 | * 12/1994 | Lam ...................................... | 358/405 |
| 5,515,176 | * 5/1996 | Galen et al. ........................... | 358/403 |
| 5,671,285 | * 9/1997 | Newman ................................ | 380/30 |
| 5,715,070 | * 2/1998 | Tone et al. ............................ | 358/468 |
| 5,923,763 | * 7/1999 | Walker et al. ......................... | 380/51 |

* cited by examiner

Primary Examiner—Gail O. Hayes
Assistant Examiner—Christopher M. Tucker
(74) Attorney, Agent, or Firm—Joseph Yang; Robert B. Beyers; Skadden, Arps et al.

(57) ABSTRACT

The present invention provides an apparatus and method for confirming, timestamping, and archiving documents using telecopiers (e.g., facsimile machines). A user sends a document to a timestamping service via facsimile, which archives the transmission with a timestamp. A submission receipt, containing size-reduced images of the submission and a document identification value (DIV), is prepared and sent to the sender. The DIV can later be submitted to the timestamping service to obtain verification that the document was received at the indicated time. In addition, the invention allows for various other forms of document transmission, document identification, and timestamp verification. The invention is thus useful in any situation where it is desired to prove that a document was in existence at a given time. Other embodiments of the invention provide senders of facsimile and telecopier transmissions with confirmation that their transmissions were received successfully.

47 Claims, 4 Drawing Sheets

APPARATUS AND METHOD FOR CONFIRMING, TIMESTAMPING, AND ARCHIVING PRINTER AND TELECOPIER TRANSMISSIONS

FIELD OF THE INVENTION

The invention relates generally to the secure automated exchange, management, and processing of documents; and specifically to systems for confirming, timestamping, and archiving facsimile and other telecopier transmissions.

BACKGROUND OF THE INVENTION

The ability to create and verify timestamps on documents is important for many business functions, since parties often need to be able to convince others as to when documents were created and that documents have not been altered. The traditional solution to this problem is to use a notary public, but traditional notarization is time-consuming, requires the physical presence of a licensed notary, does not detect many kinds of document tampering, and provides security which relies solely on the integrity of the notary.

There are alternate ways to timestamp documents known in the background art. For example, the employee time card recorder of U.S. Pat. No. 3,638,233 to Futter allows the user to timestamp pieces of paper (e.g., timecards). However this type of apparatus is not secure enough for many timestamping applications. Specifically, the timestamp is not cryptographically bound to the contents of the document, so dishonest users can modify stamped documents or stamp blank pages to write on later. As with the notary, there is no assurance of the integrity of the information contained in the timestamped document.

Techniques for timestamping digital data are also known in the background art. Many such techniques, including those of U.S. Pat. Nos. 5,001,752 and 5,422,953 to Fischer and U.S. Pat. No. 5,189,700 to Blandford, rely on customized, tamper-resistant hardware. Such tamper-resistant hardware systems are extremely difficult to design, expensive to manufacture, and are often broken by attackers. Furthermore, because these systems are designed to work only with electronic data, while most business documents are on paper, they have not found widespread acceptance in commercial settings.

Other approaches known in the background art require that users submit digital data to timestamp (or a cryptographic hash of the data) to a centralized, trusted timestamping service. In "Cryptography and Data Security," Addison Wesley (1983), p. 165, Dorothy Denning describes a similar timestamping technique in which a trusted service combines the user's data with the digital representation of the date and time, then digitally signs the result using a digital signature function such as the RSA algorithm of U.S. Pat. No. 4,405,829 to Rivest et al. To verify that the data and timestamp have not been altered or forged, one uses the timestamp service's public key to check the digital signature. The technique is described by Denning is designed to allow verification of data signed by A even if A's signing key is later compromised. The timestamping service S receives the data to timestamp, typically $D_A(M)$ (the message M digitally signed by A, using digital signature algorithm D). S then combines $D_A(M)$ with the time T and digitally signs the result, returning $C=D_S(D_A(M), T)$. Anyone with the public key for S, knowledge of the timestamped message $D_A(M)$, the time T, and digital signature C can verify the signature to confirm that, according to S, the message $D_A(M)$ was timestamped at time T.

Other digital data timestamping service designs are known in the background art. For example, techniques using catenate certificates and hash trees as described in U.S. Pat. Nos. 5,136,646 and 5,136,647 (now U.S. Pat No. Re 34,954), both to Haber et al., provide roughly similar functionality as the system described by Denning and can help to prevent the timestamping service from acting dishonestly. U.S. Pat. No. 5,022,080 to Durst also describes a timestamping apparatus and method for electronic notarization. A significant problem with these timestamping systems is that timestamp verification requires knowledge of the exact message signed (e.g., $D_A(M)$ and T), which users are responsible for archiving.

Although existing digital timestamping service designs can provide acceptable security against tampering and forgery of digital data, they are not well suited to the world of paper documents. Specifically, they either fail to disclose techniques for dealing with paper documents, or disclose techniques that are too complicated or too expensive for widespread acceptance. Furthermore, verification of a digital timestamp requires knowledge of the exact data which were timestamped. Scanning a paper document twice tends to produce slightly different results; thus, the digitized image produced during the verification process will often not match the timestamped version, causing verification to fail unless users archive the actual digital data which was timestamped. Finally, because specialized apparatuses are required to create timestamps and perform the verification, existing digital timestamps are useless to people who lack such hardware or software.

A different, but also important, problem is providing proof of transmission and proof of receipt for telecopier transmissions. In particular, including when using the timestamping service of the present invention, telecopier and facsimile users may require confirmation that their transmissions were received and processed successfully. Although standard facsimile protocols allow the recipient to report transmission errors, such acknowledgment does not guarantee that the entire transmission process was successful. For example, the recipient's facsimile may report success even if its printer runs out of ink and thus produces unreadable output pages.

U.S. Pat. No. 5,432,618 to Monnot et al describes a technique by which, if both parties have specially-equipped hardware devices, successful transmission can be confirmed for a small block of specially-formatted summary text at the beginning of the transmission. Although U.S. Pat. No. 5,432,618 can provide authentication for the benefit of the receiver of a transmission, the sender is not assured that the recipient obtained a complete and legible copy of the document. Also, only a small fraction of the information contained in the document is confirmed: additional complicated user interactions are required to generate the summary data to confirm; complicated optical character recognition technology is required; and users must have specialized hardware (e.g., a smart-card and a specially-equipped facsimile machine).

U.S. Pat. No. 5,377,017 to Lam describes a means of providing return receipt capabilities for facsimile in which the complete pages transmitted, or a portion thereof (i.e., the top third of the first page and the bottom third of the last page) are returned to the sender. However, the receipt is either incomplete (providing no assurance for non-confirmed portions) or is as long as the entire document. Also, Lam's receipt is generated from the transmission while it is still in electronic form, and does not guarantee that the recipient's facsimile actually printed the transmission legibly.

U.S. Pat. No. 4,779,106 to Mills, U.S. Pat. No. 4,849,821 to Allen et at., and U.S. Pat. No. 4,545,031 Kobayashi describe techniques for scanning the output pages from photocopiers or printers, and comparing the results against reference pages to detect errors.

U.S. Pat. No. 5,566,230 to Cairo describes an apparatus which can be integrated with a telephone switch to monitor facsimile transmissions and print an additional copy, which can be certified and sent via registered mail to the sender. However the delay imposed by the mailing of the certified copy is a significant problem for senders who require immediate confirmation. Specialized equipment must also be installed at the telephone switch, making the system difficult to implement. The system is also expensive to operate, since paper printouts must be produced, certified, and mailed. Finally, although the sender's transmission is certified, there is still no guarantee that the recipient's facsimile machine produced a complete and legible printout of the document.

The foregoing shows that there exists a need for a timestamping system that is suitable for use with paper documents, yet provides cryptographically-assured verification, and which is accessible to users with no modification to their existing document transmission devices (e.g., facsimile machines).

SUMMARY OF THE INVENTION

The present invention describes a trusted timestamping service ("TTS") for documents which can be used by anyone with a standard facsimile machine connected to the public switched telephone network. More generally, it can be implemented using any telecopier protocol or device. A user uses a facsimile machine (or other form of telecopier) to send documents or other images to be timestamped to the TTS, where they are received by a facsimile modem (or other form of telecopier) and stored in digital form. The TTS optionally identifies the sender and verifies that the sender is authorized to use the system. The TTS then typically computes or obtains a timestamp (or other form of secure time indicator) corresponding to the digital document, and archives the digital document with the corresponding time indicator. Finally the TTS sends a receipt to the user, via facsimile (or other form of telecopier). This receipt confirms the transaction and typically includes size-reduced versions or other representations of the images received, allowing the user to confirm that the images or documents were received properly. A document identification value ("DIV") or other telecopier transmission identifier ("TTI") is also included (optionally in bar-coded form) on the receipt to identify the document and timestamping transaction for future verification. A DIV is an alphanumeric value identifying a document and/or document submission. A TTI is any information which can be used to identify a telecopier transmission or its contents.

To verify the integrity and timestamp of a document, a verifier contacts the timestamping service and submits the DIV (or other TTI) via facsimile transmission, interaction with a touch-tone voice response unit ("VRU"), voice call, electronic mail, or other means. The TTS confirms that the DIV corresponds to a valid document within its archive and, if so, retrieves the document and sends it via facsimile (or other form of telecopier), along with a human-readable time/date indicator showing when the document was timestamped, back to the verifier. The verifier trusts the document's integrity and the time/date indicator because they were received in response to a query sent to the TTS.

Thus, the security of this verification process depends on the integrity of the telephone network (or other communications system). In cases where greater assurance is required, a cryptographically timestamped digital file from the TTS's archives can be obtained and verified directly. However, this higher-assurance verification requires a computer or other apparatus in addition to, or instead of, a standard facsimile machine.

In another embodiment of the invention, return receipts having image pages are used to provide assurance of delivery in facsimile and other telecopier systems which do not necessarily involve secure timestamping. Where the TTS includes paper printing of received images, a scanner at the TTS may be used to record the image pages as they are printed. The scanned images are stored in a memory and transmitted back to the sender, providing assurance that the transmission and printing operations were successful.

DETAILED DESCRIPTION OF THE INVENTION

With the present invention, the owner of a document or other image to be timestamped sends the document to a trusted timestamping service ("TTS") via facsimile ("FAX") or telecopier. Said images may be of any type including, without limitation: contracts, wills, and other legal documents; engineering diagrams or specifications; laboratory notebook pages; meeting minutes; contest entries; predictions such as expected results of sporting events; medical records; information to be held in escrow; auction bids; accounting records; correspondence; computer source code or data; printouts of cryptographic hashes; audit or transaction logs; photographs (color or black and white); and blueprints. Said transmission may be manual or performed automatically, such as by a computer. Although the preferred embodiment of the invention relates to standard facsimile machines handling ordinary paper documents, it also has applicability to all manner of telecopiers.

A standard facsimile machine is a device consisting of a scanner, printer, and modem, and which is capable of scanning documents and transmitting images of said scanned documents via ITU-T (formerly CCITT) class 1,2, 3, or 4 protocols (including future versions thereof), or similar protocols; and also capable of receiving and printing transmissions sent by a compatible facsimile machine. Facsimile techniques and protocols are well known in the background art and need not be described here. See, for example, ITU-T Recommendation T.4 (previously CCITT Recommendation T.4) and ITU-T Recommendation T.30 (previously CCITT Recommendation T.30). The term "facsimile device" as used herein refers to standard facsimile machines, as well as other devices such as FAX modems which communicate via standard facsimile protocols and which can interoperate with standard facsimile machines.

Although facsimile machines generally send their communications via the public switched telephone network (PSTN), some corporations route facsimile transmissions through other networks to reduce long distance telephone charges or to improve performance.

The term "telecopier" refers to any image communication system for still images including, without limitation, facsimile devices. Telecopiers may use any image inputs, including cameras, document scanners, medical imaging equipment, etc. Similarly, telecopiers can use any image output mechanism, including printers, cathode ray tubes, liquid crystal displays, etc. Telecopiers can communicate using any network, digital or analog, including the public switched telephone network, radio, cellular telephone, fiber optic cables, satellite, computer networks such as the Internet, etc.

It is expected that the most common business environment will involve facsimile transmissions of documents and, as a matter of convenience, the invention will be described in that context in the figures that follow. Nevertheless, it will be understood that, in general, any telecopier system can be used instead of (or in combination with) the disclosed facsimile devices for timestamping and archiving of images generally.

System Overview

Figure 1:
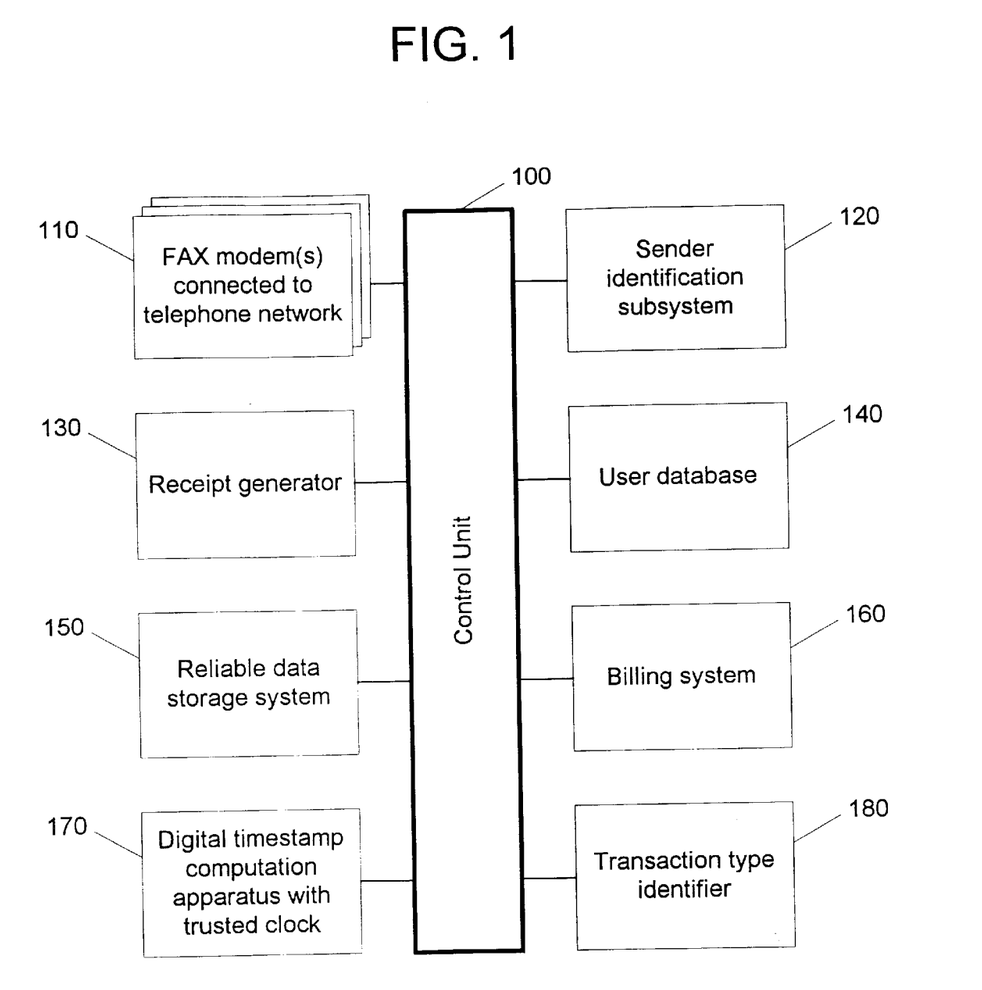
FIG. 1 illustrates an exemplary implementation of the system for timestamping documents received via facsimile.

FIG. 1 is an overview of one embodiment of the present invention in block diagram form. In this embodiment, the system's functional units are connected to a control unit 100, which is typically implemented in software running on a microprocessor. The control unit 100 is connected to one or more facsimile-capable modems 110, which in turn are connected to the public switched telephone network. The modems 110 are capable both of receiving facsimile transmissions (such as submitted documents) and sending facsimile transmissions (such as submission receipts). Alternatively, separate modems could be used for sending and receiving. Modems 110 may share a single telephone number.

Calls received via modems 110 are identified via sender identification subsystem 120. Sender identification subsystem 120 may also be used to determine the type of operation desired (e.g., assume the transmission is a document submission, but perform a timestamp verification if a valid bar-coded DIV is included on the first page). The user's identity is then sent to a user database 140, which maintains information about registered users of the system, for associating user identification parameters with billing information and account configuration data. These data are sent to billing subsystem 160 to bill or charge users for use of the system.

In the illustrated embodiment of the invention, the control unit 100 is interfaced with a digital timestamp computation apparatus 170 to compute cryptographically-verifiable timestamps on digital data received from the control unit 100. Although the timestamp apparatus 170 in the illustrated embodiment includes an accurate and trusted clock providing a secure time indicator (e.g., date and/or time in local and/or GMT format), such a clock is not always necessary; network communications with an external clock, the catenate certificate or hash tree techniques of U.S. Pat. Nos. 5,136,646 and 5,136,647 (now U.S. Pat. No. Re 34,954), secure sequence counters, or other means to ensure that timestamps are trustworthy may be used. As a matter of convenience, the term "time" should be understood to include either of both "time" and "date," are closely related, e.g., time is sometimes expressed as elapsed seconds since Jan. 1, 1900. The important point is that these terms both express chronological measures, one or both of which may be appropriate to a particular situation depending on the frequency of timestamping operations.

For added security, the timestamping operation may use a digital signature function which requires the cooperation of several cryptographic key holders. Multiple timestamping apparatuses which independently timestamp the data may also be used. The timestamp apparatus 170 may be physically separate from the other components of the system, and may be a service operated independently from the rest of the system and accessed through a hardware and/or software interface appropriate to the particular apparatus used.

The control unit 100 is also connected to a data storage subsystem 150, which is used to archive timestamped transmissions. As illustrated, storage subsystem 150 should be reliable, since accidental loss of data could render timestamps unverifiable. Storage subsystem 150 should also be secure to prevent accidental disclosure of users' (possibly confidential) submissions. Reliability can be achieved by using redundant storage systems, such as R.A.I.D. hard disk systems which are well known in the background art. Careful system administration with regular backups are also recommended. For further reliability, storage subsystem 150 may include internetworked facilities at separate geographical locations.

For added security, data may be encrypted (using either public key or symmetric cryptography, or both) before being stored. A hash or message authenticity code (such as the HMAC algorithm described by Bellare et al. ("Keying Hash Functions for Message Authentication," *Advances in Cryptology—Crypto '96 Proceedings*, Springer-Verlag, 1996, pp. 1–15.) or any other integrity-assuring one-way function) may also be computed and included to protect the data against tampering. The keys for encrypting and/or decrypting the data may be stored in software, stored in hardware tokens, placed on the return receipt, or any combination of the above. For example, in the Data Encryption Standard (DES) algorithm (defined in National Bureau of Standards FIPS PUB 46-1), a randomly-chosen key may be used to encrypt the data. A representation of the decryption key may be included on the return receipt (either included as part of the DIV or separately). In this case, the TTS stores the ciphertext, but is not required to store a copy of the decryption key locally (i.e., it may be purged once the receipt is sent). The TTS may also escrow decryption keys (e.g., using the public key of a third party), or store decryption keys encrypted under a public key corresponding to the user, or send decryption keys to a third party for storage, or send decryption keys to the user for storage.

Finally, a receipt generator 130 manipulates the images of the received transmission, typically incorporating additional information obtained from other system components, to produce one or more submission receipt pages per transmission. In one preferred embodiment, the receipt generator 130 includes functionality (i.e., hardware and/or software) to size-reduce (e.g., digitally convert to a lower resolution or otherwise reduce in size) the received images; and to combine elements including the size-reduced images, other images, descriptive text, user information, secure time indicators converted to a human-readable form (e.g., "Jul. 16, 1995, 12:34 am GMT"), or document identification values (in alphanumeric and/or bar-coded form) to form receipt images.

The above describes the operation of the receipt generator 130 during receiving mode (to be discussed later with respect to FIG. 2). The receipt generator 130 is also used during timestamp verification mode. As will be discussed later with respect to FIG. 3, such operations may require the uncompression of compressed transmissions, an additional capability of receipt generator 130 which is well known in the art and need not be described in detail here. In general the content and layout of the receipt may be configurable, depending on the type of transaction (e.g., document submission, timestamp verification, etc.) in accordance with configuration parameters from user database 140.

Document Submission And Timestamping

Figure 2:
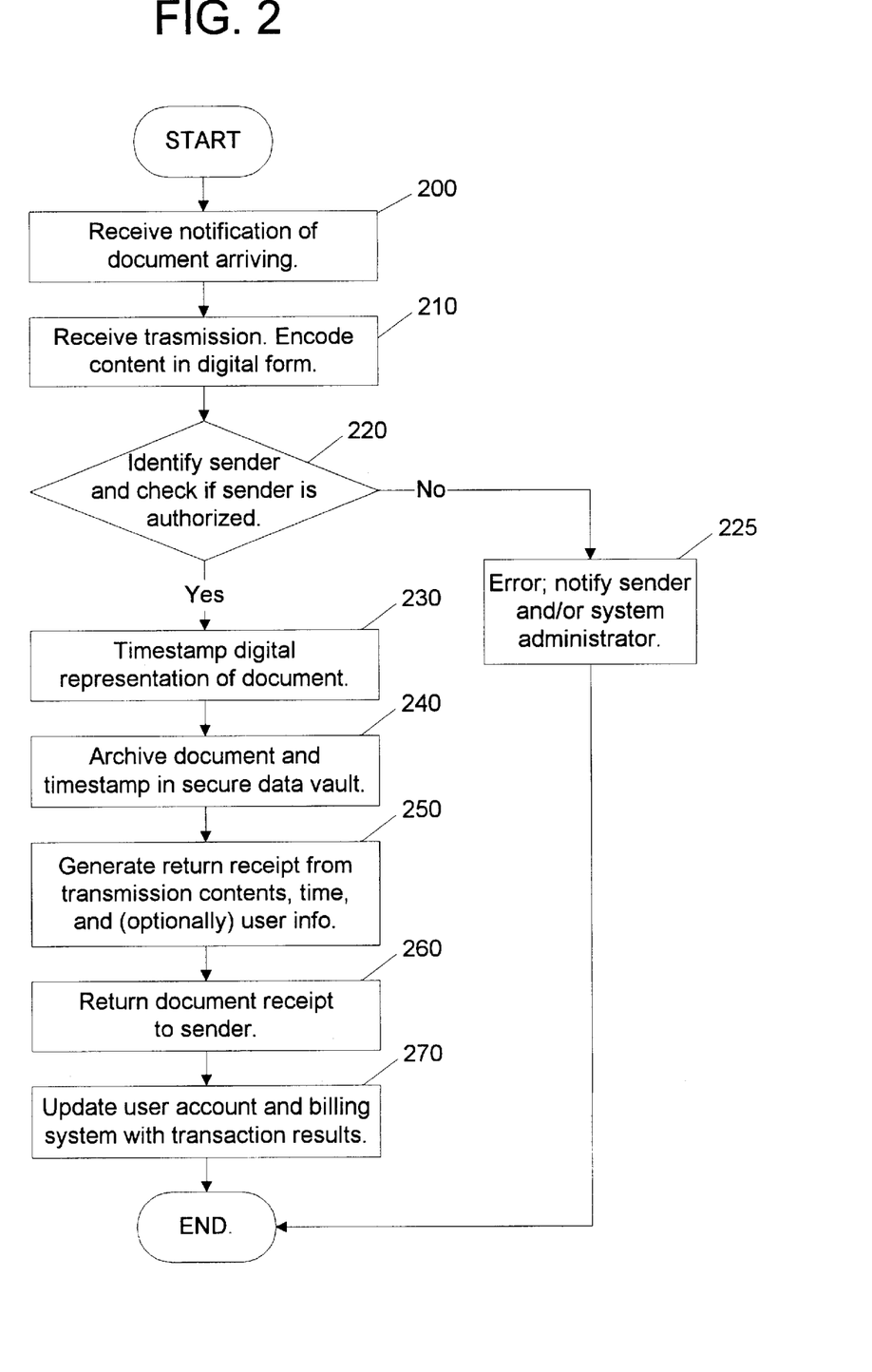
FIG. 2 schematically illustrates the process used by the TTS to timestamp a document received via facsimile.

FIG. 2 is an overview in block diagram form of one embodiment of the present invention designed for facsimile transmissions. At step 200 the TTS receives notification that a facsimile transmission is arriving, typically by detecting a ring signal on a telephone line connected to a facsimile modem 110. At step 210, said transmission is received as, or converted into (e.g., by a modem), digital form at the receiving site and stored in a memory. The digital images may be stored using any structure or format (e.g., TIFF, GIF, JPEG, bitmap, proprietary formats, etc.) At step 220, the sender identifier 120 electronically identifies the document sender so the system will later be able to send a submission receipt, and/or for billing purposes. For facsimile transmissions, said identification can often be made using a look-up table of known telephone numbers or names sent by the calling facsimile device (e.g., in a facsimile subscriber information field). Many other identifiers can also be used, including but not limited to: 1) the caller's telephone number as identified using automatic number identification (ANI) or Caller ID, 2) the called telephone number (e.g., if the TTS provides users with dedicated telephone numbers), 3) DTMF codes sent before the data transmission, 4) serial numbers and other information contained in control messages sent during facsimile transmission, or 5) identification or billing information included in the facsimile transmission (e.g., a credit card number, telephone number, or an alphanumeric or bar-coded identifier placed on one or more pages of the transmission). Other types of telecopiers or more advanced facsimile devices may use other or additional identifying characteristics, such as the sender's network address, device serial numbers, verification of a cryptographic key or certificate held by the sender, ownership of an authorized smartcard, etc. If no satisfactory identification can be made or if the sender is not authorized to use the system, the system optionally reports an error to the sender and/or a usage monitor (e.g., via facsimile) and the transaction is concluded at step 225.

If the sender identification at step 220 is satisfactory, the system proceeds to step 230, where the digital data are cryptographically timestamped using digital timestamp computation apparatus 170. In one preferred embodiment, timestamp computation involves obtaining the date and time from a trusted clock and performing a verifiable cryptographic operation on the digital document data plus the date/time (e.g., combining the hash of the digital data with the date and time, hashing the combination, and digitally signing the result using a private RSA key). As previously described, other techniques, such as the hash tree and catenate timestamping techniques described by Haber et al., may also be used. The apparatus which performs the basic timestamping operation may be, without limitation, the computer which is connected to the modem, or a smart-card or other cryptographic token connected to said computer, or a separate timestamping device or service connected to said computer via a computer network. One benefit of this latter embodiment is to minimize long distance telephone charges by enabling the TTS to place the portions of the apparatus which receive transmissions at a site which is not secure enough to perform the actual timestamping operation, but which is a local telephone call for the sender. In this case, the receiving system would send the received data (or a representation thereof, such as a cryptographic hash) to a remotely-located (i.e., external) timestamping facility, which would respond with the timestamp. As mentioned previously, multiple timestamps or secure time indicators, even from different digital timestamping facilities using different timestamping algorithms, can be obtained by the TTS.

At step 240, the digital form of the document and the corresponding timestamp are archived by the TTS in storage subsystem 150. Auxiliary information, such as the type of transmission, information about the sender, etc. may also be stored in the archive. The archived digitized document and timestamp are retrieved when users (e.g., the sender or a third party to whom a timestamp is being certified) wish to verify digital timestamps, as will be described later with respect to FIG. 3. As described earlier, data storage subsystem 150 may use redundancy and encryption for added reliability and security.

At step 250, the receipt generator 130 prepares a submission receipt for the sender. In the preferred embodiment of the invention, this receipt includes reduced-size images of each page received, a time/date indicator showing when the document was timestamped, and a DIV in human-readable and machine-readable (e.g., bar-coded) formats. The reduced-size images are included so the sender can verify that the transaction was successful and that no pages were damaged or omitted. The image size reduction, although not strictly required, is performed to reduce transmission time, to reduce the length of the submission receipt, and to make space on the receipt for other information. The receipt may include, typically on a cover page or on the first page, information identifying the sender to help ensure the receipt will reach the correct party in organizations where a single facsimile device is shared among several individuals. Because verification is performed by the TTS for the user, rather than by the user directly, the time/date indicator on the receipt only needs to be human- or machine-readable; it does not need to be tamper-resistant and does not need to be cryptographically bound to the contents of the document. A DIV (or other TTI) included on the receipt is included for use in timestamp verification. Specifically, for confidentiality reasons, only parties who can present the correct DIV (or other TTI) are generally allowed to verify a document's timestamp and contents. DIV values should be sufficiently unpredictable to prevent attackers from guessing values until they find one which corresponds to an actual DIV. Other information can also be included on or with the submission receipt including, without limitation: instructions for using the service; billing and accounting information; cryptographic hashes of documents and/or timestamps; coupons; advertisements; transaction records; audit logs; forms to request special services such as new account creation, ordering diskettes containing timestamped documents in digital form, changing account preferences, verifying timestamps, etc.; images and logos; serial numbers (e.g., the total number of documents or pages received by the TTS from the document's sender to help the service later show whether a set of documents received from a particular user during a particular time period is complete); and descriptive text. As mentioned previously, the content, configuration, and layout of the receipt may be configured on a per-user, per-transaction, or per-document basis. For example, one user might wish to receive full-size (or minimally-reduced) page images for maximum clarity, while another might prefer image size reductions of 1:9 to save paper. Image size reduction ratios may also depend on the amount of detail in the received document, and may also be adjusted to minimize the number of receipt pages while taking advantage of all available space on the receipt pages. The reduction algorithm can also trim unused picture regions (e.g., by removing extra space around the margins or between lines of text), and may use different reduction ratios for the horizontal and vertical dimensions.

Figure 4:
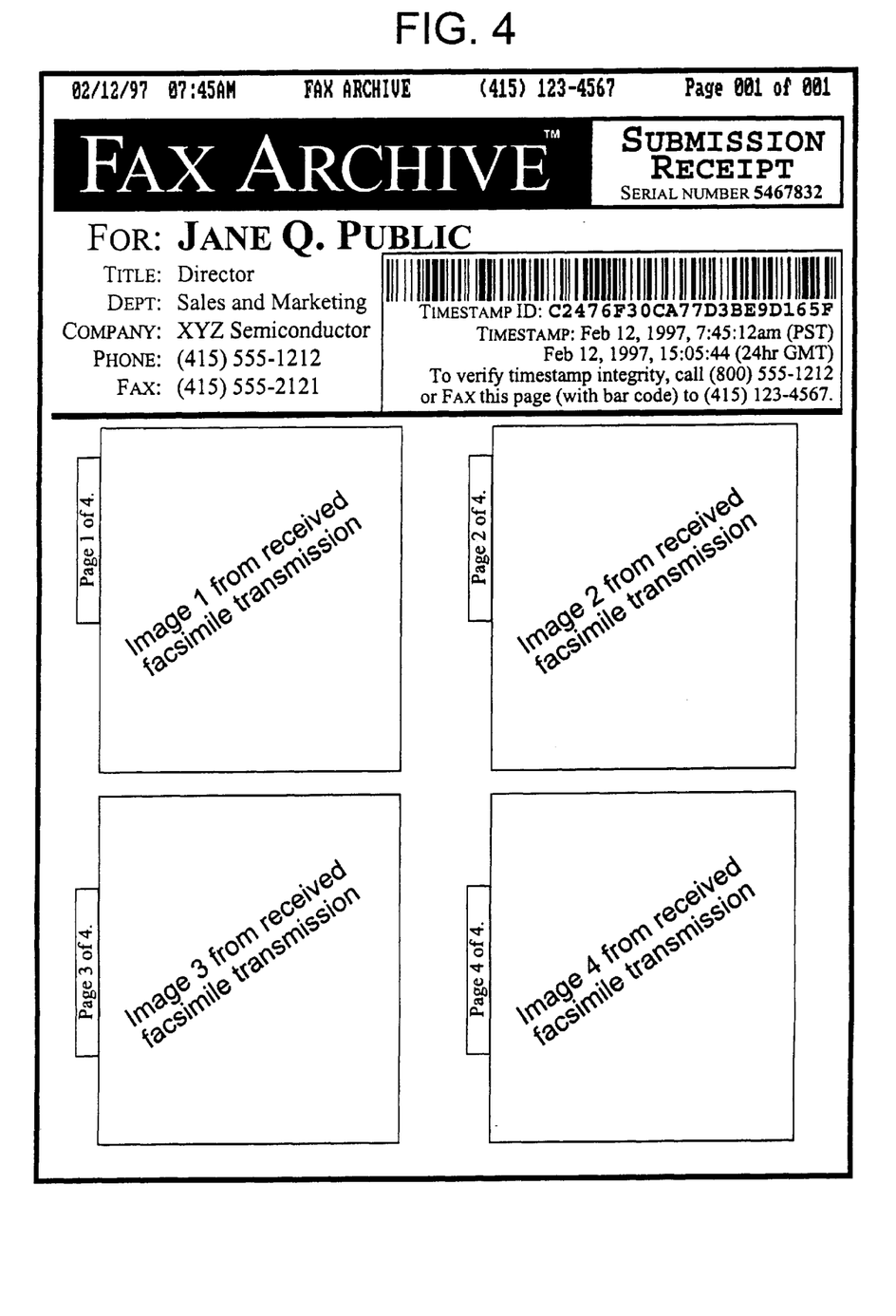
FIG. 4 illustrates an exemplary implementation of a receipt sent in response to a document submission received via facsimile.

FIG. 4 illustrates an exemplary embodiment of the submission receipt as would be constructed at step 250 in response to a multi-page document submission received via facsimile. Receipt elements could include a serial number; timestamp in both alphanumeric and bar-coded forms; human-readable time indicators showing when the document was submitted, both in local time and Greenwich mean time (GMT); instructions for verifying the timestamp; information identifying the sender; and size-reduced versions of each of the pages. Note that the actual content of the submitted documents does not necessarily need to be legible in the size-reduced pages.

At step 260, if all operations were successful, the system sends the submission receipt to the original document sender (or, if errors occur, the system may respond with a message describing the problem). Where submission receipts are sent via facsimile, it is generally necessary that the receipt be sent in a separate telephone call placed from the TTS to the document sender, since most existing facsimile protocols do not allow the recipient of a transmission (i.e., the TTS) to send images back to the sender at the end of a call. In such cases, to save on long distance charges, the TTS may arrange to transmit the receipt from a networked facsimile device remotely located from the TTS but located close to the original document sender. However, where protocols allow bi-directional communication of images, receipt pages may be interleaved with document pages, sent at the end of the original document submission, or (with a full-duplex protocol) sent simultaneously therewith. In still other methods of transmitting the receipt, the user can telephone the TTS, supply a password or identifier via DTMF ("touch-tone") signals or other means if required, then use polling transmission (i.e., where the calling party receives data from the called party) to obtain the receipt images. Although more awkward to use, this approach may be used to make the user pay for all long distance telephone charges. In all the above cases, if receipt transmission fails due to a temporary problem (e.g., if the destination modem is busy), the system will retry later. A user who fails to receive an acceptable receipt should repeat the document submission.

At step 270, the process concludes as the system updates transaction logs, audit trails, and billing records. Billing may be performed in almost any way, including pre-payment, billing to the calling telephone number, billing to another telephone number, automatic charging to a credit card, traditional invoicing, electronic fumds transfer, digital cash systems (including anonymous mechanisms), etc. If present in an appropriate form, billing information (such as a credit card or account number) may be obtained from the received telecopier images, optionally using optical character recognition techniques or bar-code scanning. Almost any billing rate structure may be used, such as charging per page, charging per minute, a flat-rate subscription fee, charging only for timestamp verification operations, etc.; or the system may be free, in which case no billing mechanism is required.

All of the above describes returning a receipt to the user during document submission. The other instance when a receipt is returned to a user is during timestamp verification. Both situations involve the user sending a transmission of the appropriate type. In one embodiment of the invention, sender identifier 120 may be configured to examine the transmission to determine the type of transaction requested, for example by scanning for a bar-coded DIV. If absent, document submission is accepted; if present, timestamping verification is initiated.

Timestamp Verification

Figure 3:
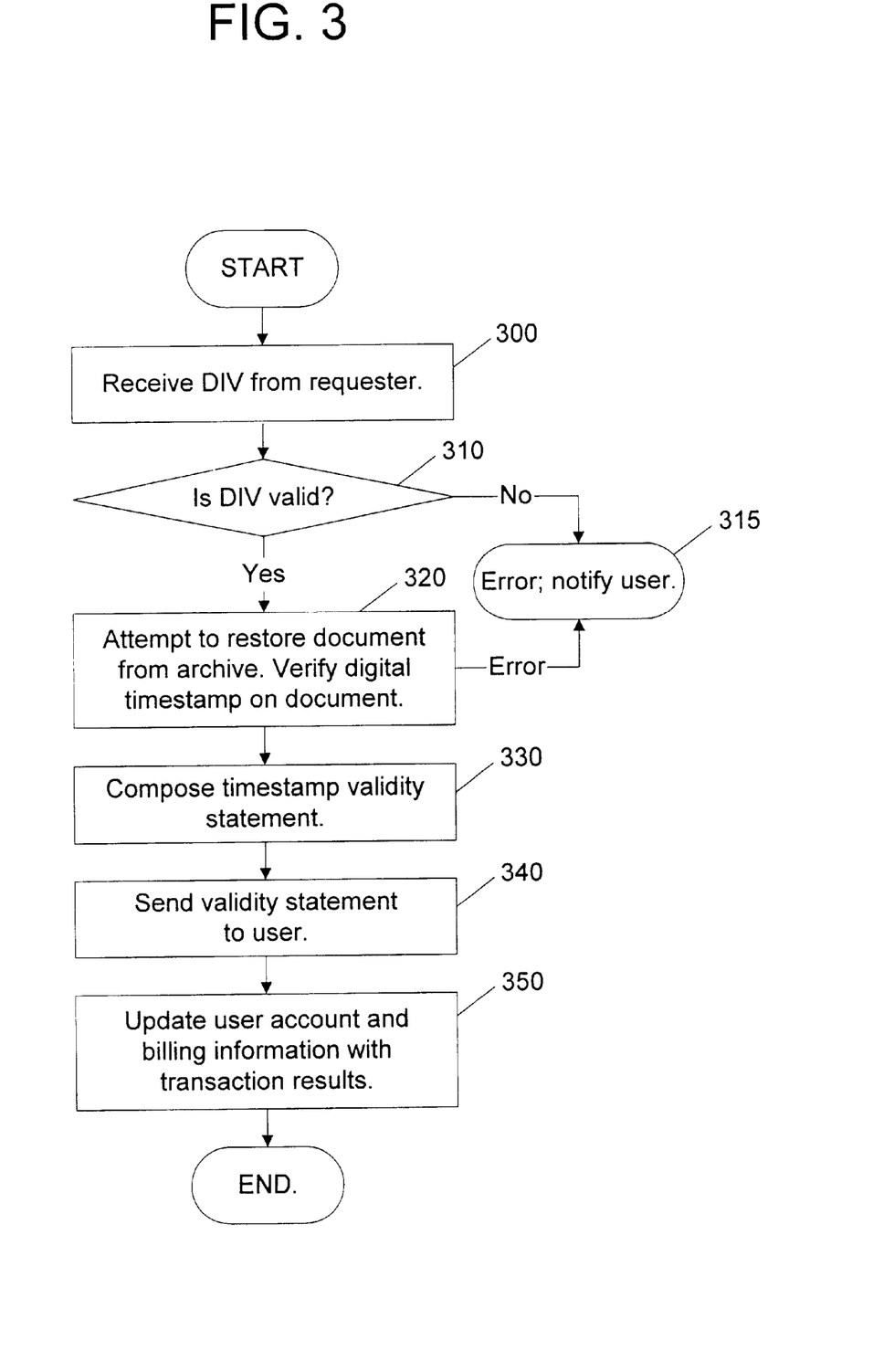
FIG. 3 schematically illustrates the process performed by the TTS when a user verifies a timestamp using a facsimile device.

Referring now to FIG. 3, the timestamp verification process, as performed by the TTS in a facsimile-based embodiment, will be described. A requester (the document sender or a third party) who wishes to verify the timestamp on a document contacts the TTS, which, at step 300, receives a DIV or TTI. For example, this may be accomplished by receiving via facsimile a document (such as the first page of a document submission receipt) containing a DIV or a representation thereof in machine-readable form. The DIV is automatically detected and decoded using bar code scanning techniques, optical character recognition, etc. Alternate DIV and TTI submission channels may be used including, without limitation: detection of DTMF (touch tone) signals, electronic submission via a computer network (e.g., Internet or world wide web), a voice call to a live operator who enters the DIV or TTI using a computer terminal, a voice recognition system, wireless radio or pager, traditional or certified mail, modem, and electronic mail. At step 310, the TTS determines whether the DIV or TTI corresponds to a document stored in storage subsystem 150. If not, an error is reported to the user at step 315. Otherwise, at step 320, the TTS retrieves the digital document from storage subsystem 150. If the document was stored in encrypted form, the TTS decrypts the document (if necessary, employing a cryptographic token, networked secure decrypting system, or other decryption mechanism), optionally using a decryption key included with or in the DIV or TTI. The digital timestamp stored with the data is then cryptographically verified as appropriate for the timestamping technique. For example, a timestamp constructed using an RSA signature may be verified by operating on the timestamp with the public key corresponding to the digital signing key used by the timestamp computation apparatus 170, then verifying that the result corresponds to the cryptographic hash of the combination of the archived digital document data and time indicator. An error is returned if document retrieval or timestamp verification fails.

At step 330, the TTS composes a timestamp verification determination. This determination is generally similar to a submission receipt, and may be constructed by the same portion of the system of the invention (i.e., receipt generator 130). The verification determination includes a human-readable indicator showing when the document was originally timestamped and the complete document images. The document images may be full size for maximum clarity, or may be reduced in size to leave extra room on the page for the date/time indicator, to reduce the size of the verification determination, or to reduce the time required to send the verification determination. Unlike the document submission transmission receipt sent at step 250 of FIG. 2 which includes document images for confirmation purposes, the document images in the verification determination must be clearly legible, limiting the degree to which the images can be reduced in size. Additional information may include, without limitation: instructions for using the service; the date and time of verification; the identity of the verifier; the identity of the original document sender; billing and accounting information; cryptographic hashes of documents and/or timestamps; coupons; advertisements; transaction records; audit logs; forms to request special services; images and logos; serial numbers; and descriptive text. The content, configuration, and layout of the verification determination may be configured on a per-user, per-transaction, or per-document basis.

Once a verification determination has been composed, it is transmitted to the user at step 340. As mentioned above, the user may be the document submitter or a third party. The user could also be the same person as the requester, or different (e.g., someone designated by the requester). The user's assurance of the determination's validity is that it was received from the TTS. Consequently a verification determination only has meaning to the party who receives it; other parties have no assurance that it was not forged or tampered with. Verification determinations may be returned via facsimile or telecopier, via the Internet or world wide web (typically using a cryptographically secured connection), via mail or courier, or by any other means. The system concludes at step 350 by updating billing records, audit trails, transaction logs, etc.

In cases with exceptionally high security requirements, the above verification process may be inadequate. Specifically, it assumes that the telephone network or other communications medium used to convey the verification determination will not connect the requester or user to an impostor service which gives false verification determinations or allow attackers to substitute legitimate verification determination transmissions with forgeries. For a higher degree of assurance, the verifier and TTS can use secure encrypting and/or authenticating facsimile devices, which are known in the background art (e.g., U.S. Pat. No. 5,430,800 to Miura). For an even higher degree of assurance, the user can be sent the digital data with the actual digitized document (optionally in compressed form) and/or the corresponding cryptographic timestamp. Such digital data may be communicated directly to the user by the TTS or sent via the original document sender; and may be communicated via electronic mail, the Internet or world wide web, modem, satellite broadcast, radio, diskette, physical media (CD-ROM, digital versatile disk (DVD), tape, etc.), facsimile (using "glyph" techniques such as those of U.S. Pat. No. 5,486,686 to Zdybel, Jr. et al. or of U.S. Pat. No. 5,530,755 to Pailles et al. which allow digital data to be encoded in images or bitmaps, typically with error correcting codes to assist in recovery of the encoded data if the image is degraded during transmission, printing, and scanning), or using any other digital media, communications channel, or network. Communication of digital timestamp data may be immediate (i.e., included with, in addition to, or in lieu of a submission receipt of the type illustrated in FIG. 4), but is more commonly time-delayed, periodic (e.g., mail a CD-ROM once per month), or performed only upon request. Once received by the user, the digital document may be viewed, printed, etc., and the corresponding cryptographic timestamp can be verified using whatever verification technique is appropriate for the digital timestamping method or methods used. Although direct digital timestamp verification by the user is somewhat more secure than verification using the process of FIG. 3, it is generally not necessary and is more difficult to perform since special computer software is needed.

In an alternate embodiment of the invention, no DIV is required for timestamp verification. Instead, a party wishing to verify the contents and timestamp on a document transmits the document to the TTS, which searches its archive for the document. In this case, the document itself serves as its own telecopier transmission identifier (TTI). The timestamp verification procedure then continues as described previously with regard to a document that was located by its DIV. This matching system eliminates the need for a special DIV, but increases the complexity and computational requirements of the TTS.

In conclusion, facsimile-based timestamping is convenient, easy, and does not require that the user have any specialized hardware or software. The process is also more secure than traditional notarization, since the security of the service depends on a single, carefully-managed secure facility or timestamping mechanism.

Non-Cryptographic Secure Time Indicator

In an alternate embodiment of the invention, the TTS does not use a cryptographic timestamping mechanism to produce secure time indicators. Instead, a non-cryptographic secure time indicator is constructed. This indicator may be a certified printout, signed affidavit, digital time mark stored in a secure archive, or other secure indicator which is sufficiently secure to convince third parties of the time indicator's accuracy and authenticity. Document verification can be performed as illustrated in FIG. 3, except that at step 320 no cryptographic timestamp verification is possible, so TTS must use other means to ensure that time indicators are protected against tampering. Furthermore, no independently-verifiable timestamp is available.

Proof of Receipt

In another embodiment of the invention, receipt generation using digital image processing may be used for non-timestamping applications where a delivery guarantee is required. Specifically, a facsimile or telecopier transmission is stored in a computer memory by the system. The received images are digitally processed to a smaller size and additional information (such as transaction results, time indicators, text, logos, etc.) is added. The resulting images are retransmitted back to the original sender for verification. This approach works well for verification of facsimile (or more generally, telecopier) transmissions which are interpreted by a computer. Alternatively, a scanner may be used to record the actual printed output page generated by a facsimile device. Such output will typically be printed on paper, or some other suitable substrate (e.g., plastic films, photographic stock, etc.). The scanned image is stored in a memory and then retransmitted back to the sender as a transmission receipt, typically after the original message transmission is complete. The image in the receipt may be digitally processed before retransmission to resize the images, add text or graphics, encrypt the images, digitally-sign the images, etc. Because the receipt includes an image of the actual printed page, a legible receipt provides the sender with assurance that both the transmission and printing operations were successful.

Alternate Embodiments of The Invention

Although the various embodiments described above contain many specificities, these should not be construed as limiting the scope of the invention but merely as providing illustrations of some of the exemplary embodiments thereof. For example:

- The order in which various operations are performed can, in many cases, be changed without significantly altering the functionality of the service.
- The physical and logical arrangements of the components of the system may be altered without significantly altering the functionality of the service. For example, many of the components of FIG. 1 can be combined into a single software program.
- Rather than send a full submission receipt with a TTS-generated DIV or other TTI after a document is submitted, the TTS can use a DIV received from the user (e.g., via a bar code on a facsimile cover sheet), or return a DIV during the document submission facsimile transmission (e.g., in a subscriber information field normally reserved for TTS's facsimile telephone number). If no receipt with document images is sent automatically, users who require a submission receipt can perform verification as illustrated in FIG. 3. This embodiment has the advantage of not requiring telephone calls from the TTS to the user.

Specially-equipped telecopiers may produced for use with the system. Such a telecopier would include a document scanner, and the ability to send a document to the TTS and receive notification of successful receipt. If transmission is digital (i.e., error-free), notification could, for example, consist of a cryptographic hash of the data received which the sending telecopier can verify corresponds to the data sent. The TTS timestamps and archives the document (e.g., as illustrated in FIG. 2.) An alternate embodiment of a specialized device could send only the cryptographic hash of the scanned document for timestamping and would store the scanned images locally. Telecopiers which support both standard and timestamping modes can also be produced.

Processes of size-reducing and rescaling images may include operations to improve image sharpness or compensate for image quality degradation during the transmission process.

For added reliability, performance, or security, extra or redundant system components may be used. Redundant components may be physically distant and are usually, but not always, connected via digital communication links.

Any or all communications in the system can be sent in encrypted and/or cryptographically authenticated form. The TTS does not necessarily require knowledge of the decryption keys for submitted documents.

For added security, the TTS and related components (computers, secure time indicator computation apparatus, data archives, etc.) can be housed in an electronically access-controlled facility (room or building) to prevent access by unauthorized persons, or may be housed in tamper-resistant enclosures.

The digital signature may be computed using any algorithm, including RSA, the Digital Signature Standard ("DSS," defined in National Institute of Standards and Technology FIPS PUB 186), ElGamal, elliptic curve systems, and more sophisticated algorithms requiring multiple secret shares to complete a signature. Data may be hashed prior to and during computation of digital signatures. As is customary, data may be padded prior to encryption or signing.

Verifiers may require that documents have multiple timestamps or other secure time indicators, and verifiers may be configured to accept timestamps or time indicators from multiple sources.

The TTS may perform management and housekeeping functions, such as purging old documents, deleting documents when accounts are closed, etc. Prior to deleting a document in the archives, the TTS may send a digital copy of the digitized document and cryptographic timestamp to the original document sender. Parameters such as document purging schedules and security procedures for document verification can be configured on a per-user or per-document basis.

To assist with outside auditing, documents at the TTS, or values such as cryptographic hashes derived from them, may be notarized, published, audited by external agencies, etc.

The TTS can accumulate and provide records showing when specific documents in the archive were accessed or verified, and provide such records to users or authorized third parties.

Digital data encoded in image form using glyph techniques may be included on or with a receipt sent to a user. Information in the glyphs can include the digital time indicator and the actual digital form of the received telecopier transmission. Digital image data may first be compressed, optionally using lossy compression (e.g., JPEG). To assist with verification when lossy compression is used, cryptographic timestamps may be computed such that they correspond to images after they have been subjected to lossy compression.

The TTS back-end support systems can include databases for managing user accounts, tracking complaints, billing, error analysis and technical support, automated notification of errors to management personnel, auditing, and other ancillary operations.

Cryptographic timestamping operations may be performed by a physically or logically separate cryptographic unit for added security. The token can be physically removable, in which case it would typically include a separate clock and private digital signature key. The token can also be contained in a tamper-resistant enclosure.

Components of the system may be omitted in embodiments where they are not necessary. For example, if the TTS does not charge for the service or accepts credit card payments by users who do not have established accounts, the user database 140 may not be required.

Submission receipts and/or verification responses can be delayed until night time to save on long distance telephone charges, or can be routed to outgoing telephone lines local to the destination number.

Facsimile machines may have a pre-programmed button or user option for timestamping.

Therefore, it is intended that the scope of the present invention be limited only with regard to the claims listed below.

What is claimed is:

1. A method for allowing a user to verify the content and submission time of an archived telecopier transmission, comprising the steps of:

(a) at a computer-implemented verification service, receiving a telecopier transmission identifier from a requester;

(b) using said telecopier transmission identifier to locate at least one image, and a corresponding secure time indicator, in a digital archive;

(c) retrieving said at least one image and said secure time indicator from said archive; and (d) sending a verification determination, including a representation of said retrieved at least one image, to said user.

2. The method of claim 1 wherein said verification determination includes size-reduced versions of at least two of said retrieved images from said digital archive.

3. The method of claim 2 wherein said verification determination specifies, in human-readable form, when said archived telecopier transmission was originally archived.

4. The method of claim 1 wherein said step of sending said verification determination is performed via facsimile.

5. The method of claim 4 wherein said verification determination is not cryptographically verifiable by said user.

6. The method of claim 1 wherein said step of sending said verification determination is performed over the world wide web.

7. The method of claim 1 wherein said step of sending verification determination is performed via e-mailing.

8. The method of claim 1 wherein said step of sending said verification determination is performed via certified mailing.

9. The method of claim 1 wherein said verification determination is sent to said user on a physical medium.

10. The method of claim 1 wherein said verification determination is not cryptographically verifiable by said user.

11. The method of claim 10 wherein said verification determination specifies, in human-readable form, when said archived telecopier transmission was originally archived.

12. The method of claim 1 further comprising the step of cryptographically verifying that said secure time indicator: (i) is valid, and (ii) corresponds to said at least one image.

13. The method of claim 1 wherein said telecopier transmission identifier includes an image representation corresponding to said at least one said digitally archived image.

14. The method of claim 13 wherein said step of using said computer to locate said at least one archived image includes comparing said image representation from said telecopier transmission identifier against a plurality of candidate images in said archive until a sufficiently close match is determined.

15. The method of claim 1 wherein said telecopier transmission identifier includes a representation of a cryptographic key which may be used to decrypt said at least one located image.

16. The method of claim 1 wherein: (i) said step of receiving said telecopier transmission identifier is performed via facsimile, (ii) said telecopier transmission identifier is in machine-readable form; and (iii) said machine-readable form is decoded by computer.

17. The method of claim 16 wherein said telecopier transmission identifier is in bar-coded form.

18. The method of claim 1 wherein said step of receiving said telecopier transmission identifier is performed via a computer network.

19. The method of claim 18 wherein said step of receiving said telecopier transmission identifier is performed via operator entry using a computer terminal.

20. The method of claim 1 wherein said step of receiving said telecopier transmission identifier is performed via a telephone voice response unit.

21. The method of claim 1 wherein said telecopier transmission identifier is a human-readable, alphanumeric document identification value.

22. The method of claim 1 wherein at least one of said steps (b), (c), (d), and (e) is performed using a remote computer accessed via a communications network.

23. The method of claim 1 wherein said user is an original sender of said transmission.

24. The method of claim 1 wherein said user is other than a sender of said transmission.

25. The method of claim 1 further comprising the step of decrypting said at least one image.

26. The method of claim 1 wherein at least one of said steps (a), (b), (c), and (d) occurs in a secure facility having electronic access control.

27. The method of claim 1 further comprising the step of billing said user.

28. The method of claim 1 further comprising the step of recording information about at least one of steps (a), (b), (c), and (d) in an audit log.

29. A system for verifying the content and submission time of an archived telecopier transmission, to a user of said system, comprising:

(a) an interface for receiving a telecopier transmission identifier;

(b) a storage subsystem configured to provide: (i) at least one image corresponding to a telecopier transmission identifier received from said interface, and (ii) a secure time indicator corresponding to said image;

(c) a receipt generator for generating a verification determination, including a representation of said image, for transmission to a user of said system.

30. The system of claim 29 wherein said interface includes a facsimile modem.

31. The system of claim 29 wherein said interface includes a computer keyboard.

32. The system of claim 31 further comprising a facsimile modem coupled to said receipt generator for said transmission of said verification determination to said user.

33. The system of claim 32 wherein said verification determination includes a human-readable representation of said secure time indicator.

34. The system of claim 29 wherein said interface is connectable to a computer network.

35. The system of claim 34 wherein said external computer network is the Internet.

36. The system of claim 29 wherein said storage subsystem includes a plurality of storage devices.

37. The system of claim 36 wherein at least two of said plurality of storage devices are physically located in separate facilities.

38. The system of claim 29 wherein at least one of said storage subsystem and said receipt generator is accessible over a computer network.

39. A method for generating a confirmation from a received telecopier transmission, comprising the steps of:

(a) receiving via telecopier from a sender an image;

(b) printing said received image on a substrate;

(c) automatically scanning said printed substrate into digital form; and (d) sending said scanned image to said sender via telecopier.

40. The method of claim 39 further comprising the step of digitally resizing said scanned image.

41. The method of claim 40 wherein said image to print is received via facsimile; and wherein said scanned image is sent via facsimile.

42. The method of claim 39 wherein: (i) said received image is received via facsimile, and (ii) said scanned image is sent via facsimile.

43. The method of claim 39 further comprising the step of digitally signing said scanned image.

44. A telecopier device with automated confirmation generation capability, comprising:
   (a) a first telecopier-compatible modem configured for receiving, from a sender, an image to print;
   (b) a printer configured for printing said image onto a substrate;
   (c) a scanner configured for scanning said substrate into digital form, after said substrate has been printed upon by said printing mechanism;
   (d) a memory to store said digital form; and
   (e) a second telecopier-compatible modem capable of sending, to said sender, said digital form.

45. The system of claim 44 wherein said first modem and said second modem are the same.

46. The system of claim 45 wherein said first modem and said second modem are facsimile-compatible devices.

47. The system of claim 44 further comprising a cryptographic module configured for digitally signing said digital form.

* * * * *